(12) United States Patent
Bai et al.

(10) Patent No.: US 10,909,386 B2
(45) Date of Patent: Feb. 2, 2021

(54) INFORMATION PUSH METHOD, INFORMATION PUSH DEVICE AND INFORMATION PUSH SYSTEM

(71) Applicant: BEIJING KUANGSHI TECHNOLOGY CO., LTD., Beijing (CN)

(72) Inventors: Kai Bai, Beijing (CN); Kai Wang, Beijing (CN); Jinyu Liu, Beijing (CN)

(73) Assignee: BEIJING KUANGSHI TECHNOLOGY CO., LTD., Beijing (CN)

(*) Notice: Subject to any disclaimer, the term of this patent is extended or adjusted under 35 U.S.C. 154(b) by 190 days.

(21) Appl. No.: 16/216,515

(22) Filed: Dec. 11, 2018

(65) Prior Publication Data

US 2019/0332872 A1 Oct. 31, 2019

(30) Foreign Application Priority Data

Apr. 28, 2018 (CN) .......................... 2018 1 0408782

(51) Int. Cl.
*G06K 9/00* (2006.01)
*G06Q 30/02* (2012.01)
*G06Q 30/06* (2012.01)

(52) U.S. Cl.
CPC ..... *G06K 9/00778* (2013.01); *G06K 9/00671* (2013.01); *G06Q 30/0261* (2013.01); *G06Q 30/0631* (2013.01)

(58) Field of Classification Search
CPC ........... G06K 9/00778; G06K 9/00671; G06K 9/00677; G06Q 30/0161; G06Q 10/10;
(Continued)

(56) References Cited

U.S. PATENT DOCUMENTS 7,383,496 B2 * 6/2008 Fukuda ............... G06F 16/9535
715/230
8,774,452 B2 * 7/2014 Bosworth .......... G06K 9/00677
382/100
(Continued)

FOREIGN PATENT DOCUMENTS

CN 105303998 A 2/2016
CN 107909443 A 4/2018
(Continued)

OTHER PUBLICATIONS

First Office Action issued by the Chinese Patent Office in the corresponding Chinese application No. 201810408782.0, dated Apr. 14, 2020 with an English translation.

*Primary Examiner* — Mahendra R Patel
(74) *Attorney, Agent, or Firm* — Marshall, Gerstein & Borun LLP

(57) ABSTRACT

An information push method includes: acquiring a monitoring image captured by a camera; identifying a target group contained in the monitoring image; performing a group relationship recognition on the target group according to attribute data of the target group to recognize a group relationship type of the target group; and pushing a recommendation information to at least one designated terminal corresponding to the target group based on the group relationship type. An information push device and an information push system are also provided.

14 Claims, 5 Drawing Sheets

(58) Field of Classification Search
CPC ... G05Q 30/0631; G06F 16/184; G06F 16/27; G06F 16/9535
USPC .......... 382/103, 195, 115, 100; 1/1; 709/204
See application file for complete search history.

(56) References Cited

U.S. PATENT DOCUMENTS

| | | | |
|---|---|---|---|
| 9,129,027 B1* | 9/2015 | Hamedi | G06F 16/9535 |
| 9,396,483 B2* | 7/2016 | Hamedi | G06Q 50/01 |
| 2004/0156535 A1* | 8/2004 | Goldberg | H04N 1/00172 |
| | | | 382/115 |
| 2006/0069747 A1* | 3/2006 | Matsushita | H04L 29/06 |
| | | | 709/218 |
| 2009/0138355 A1* | 5/2009 | Jung | G06Q 30/06 |
| | | | 705/14.23 |
| 2009/0306894 A1* | 12/2009 | Noble | G01S 13/878 |
| | | | 701/300 |
| 2010/0158471 A1* | 6/2010 | Ogikubo | G11B 27/34 |
| | | | 386/278 |
| 2012/0002881 A1* | 1/2012 | Maeda | G06K 9/00677 |
| | | | 382/195 |
| 2013/0191458 A1* | 7/2013 | Krishnan | G06Q 10/10 |
| | | | 709/204 |
| 2014/0181208 A1* | 6/2014 | Robinson | G06F 16/9535 |
| | | | 709/204 |
| 2015/0199817 A1* | 7/2015 | Ishimaru | G01S 5/16 |
| | | | 382/103 |
| 2016/0124368 A1* | 5/2016 | Nomura | G03G 15/043 |
| | | | 399/27 |
| 2017/0154157 A1* | 6/2017 | Morimoto | G16H 50/20 |
| 2018/0088677 A1* | 3/2018 | Zhang | G06F 3/011 |

FOREIGN PATENT DOCUMENTS

| | | | | |
|---|---|---|---|---|
| JP | 2013201720 A | * | 10/2013 | ......... G06K 9/00255 |
| WO | WO-2012086918 A2 | * | 6/2012 | ............. G06F 16/27 |

* cited by examiner ly illustrate the technical solutions of the
INFORMATION PUSH METHOD, INFORMATION PUSH DEVICE AND INFORMATION PUSH SYSTEM The present disclosure claims priority to Chinese Patent Application No. 201810408782.0 filed on Apr. 28, 2018, the disclosure of which is hereby entirely incorporated by reference.

TECHNICAL FIELD

At least one embodiment of the present disclosure relates to an information push method, an information push device and an information push system.

BACKGROUND

Methods for promoting business information of shopping malls, restaurants, convenience stores and other physical stores (that is, offline stores) are more traditional, mostly using distribution advertising leaflets, fixed billboards, etc., sometimes require users to enter the physical store before getting relevant information. On the one hand, it makes it difficult for merchants to dedicatedly promote products according to the special consumer category, and the information promotion effect is not good; on the other hand, it is difficult for consumers to directly learn information from desired business, and shopping experience is poor.

SUMMARY

At least one embodiment of the present disclosure provides an information push method comprising: acquiring a monitoring image captured by a camera; identifying a target group contained in the monitoring image; performing a group relationship recognition on the target group according to attribute data of the target group to recognize a group relationship type of the target group; and pushing a recommendation information to at least one designated terminal corresponding to the target group based on the group relationship type.

At least one embodiment of the present disclosure provides an information push device, comprising an image acquiring module, configured to acquire a monitoring image captured by a camera; a target group identifying module, configured to identify a target group contained in the monitoring image; a group relationship recognizing module, configured to perform group relationship recognition on the target group so as to recognizing a group relationship type of the target group; and an information pushing module, configured to push recommendation information to at least one designated terminal corresponding to the target group according to the group relationship type.

At least one embodiment of the present disclosure provides an information push system, comprising an image acquiring device, a processor, and a storage device; wherein the image capture device is configured to capture image data; and the storage device is configured to store a computer program, the computer program performing the information push method as described above when executed by the processor.

At least one embodiment of the present disclosure provides a computer readable storage medium on which a computer program is stored, wherein the computer program performs the information push method as described above executed by a process device.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Most of the information promoting methods of physical stores are more traditional, which is not convenient for merchants to conduct advertising to targeted consumers, and it is not convenient for consumers to easily learn the required information. The inventor found in the research that when consumers engage in shopping, dining or entertainment in a physical store, most of them are at least two groups of people who go to the store to consume. And among them, the group relationship can comprise many types of group relationships, such as family comprising combinations of parents, children and grandparents, lovers, and friends, and different group relationship types have their respective group characteristics and corresponding consumer needs.

At least one embodiment of the present disclosure provides an information push method, an information push device, and an information push system, which can be applied to any physical store such as a shopping mall, a dining room or restaurant, a convenience store, a KTV, etc., and can push targeted information based on a type of consumer relationship of a consumer. The present disclosure will be described in detail below in connection with embodiments.

First, an electronic apparatus 100 according to at least one example of the present disclosure will be described with reference to FIG. 1.

Figure 1:
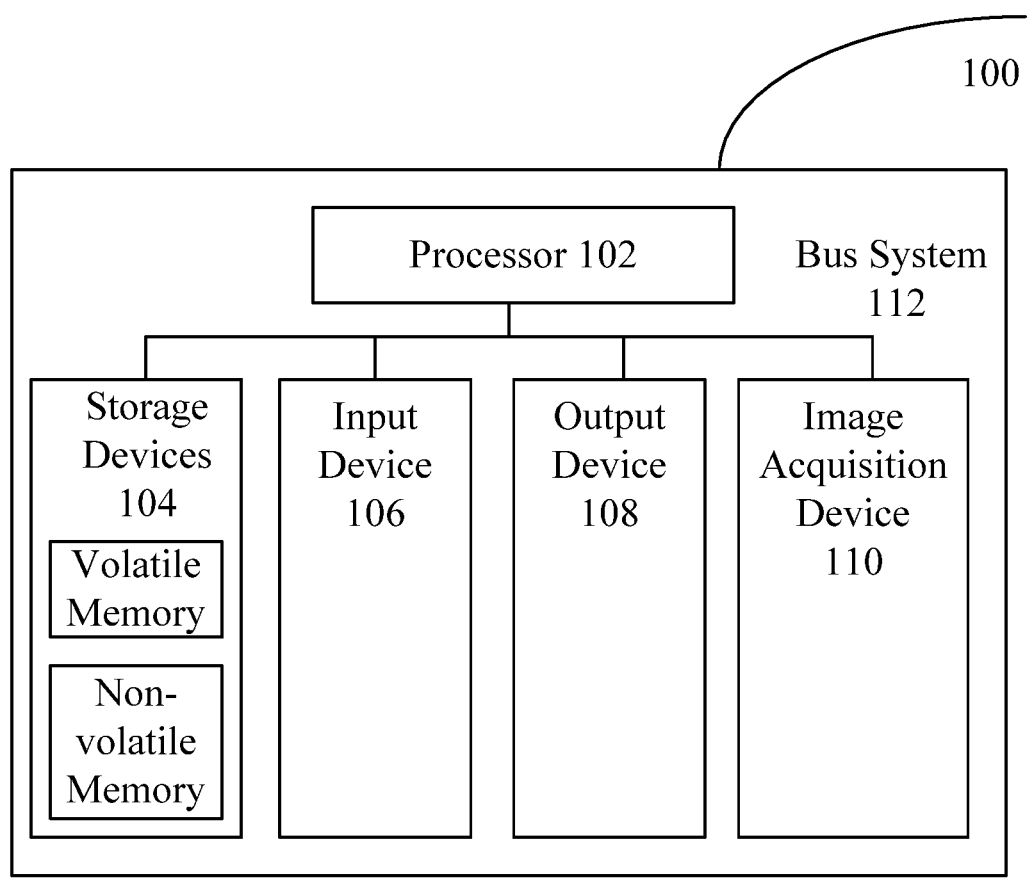
FIG. 1 is a schematic structural diagram of an electronic apparatus according to some embodiments of the present disclosure.

FIG. 1 illustrates a schematic structural view of an electronic apparatus according to an example of the present disclosure. As illustrated in FIG. 1, an electronic device 100 comprises one or more processors 102, one or more storage devices 104, an input device 106, an output device 108, and an image acquisition device 110, which are interconnected through a bus system 112 and/or a connection mechanism in any other forms (not illustrated). It should be noted that the components and structures of the electronic apparatus 100 illustrated in FIG. 1 are merely exemplary and cannot be construed as a limit to the present disclosure, and the electronic devices can have other components and structures as required.

The processor 102 can be a central processing unit (CPU) or other form of a processing unit of other forms with data processing and/or instruction execution, and can control other components of the electronic apparatus 100 to perform desired functions.

The storage device 104 can comprises one or more computer program products, which can comprise various forms of computer readable storage media, such as volatile memory and/or nonvolatile memory. The volatile memory can comprise, for example, a random access memory (RAM) and/or a cache or the like. The nonvolatile memory can comprise, for example, a read only memory (ROM), a hard disk, a flash memory, or the like. One or more computer program instructions can be stored on the computer readable storage medium, and the processor 102 can execute the program instructions to implement client functions (implemented by a processor) and/or other Expected function in some embodiments of the present disclosure. Various applications and various data can also be stored in the computer readable storage medium, such as various data used and/or generated by the application, and the like.

The input device 106 can be a device used by a user to input an instruction, and can comprise one or more of a keyboard, a mouse, a microphone, a touch screen, and the like.

The output device 108 can output various information (e.g., images or sounds) to the outside (e.g., a user) and can comprise one or more of a display, a speaker, and the like.

The image acquisition device 110 can capture images (e.g., photos, videos, etc.) desired by the user and store the captured images in the storage device 104 for use by other components.

Exemplarily, an example electronic apparatus for implementing an information push method, device, and system according to an embodiment of the present disclosure can be implemented on a smart terminal such as a smartphone, a tablet, a computer, or the like.

Figure 2:
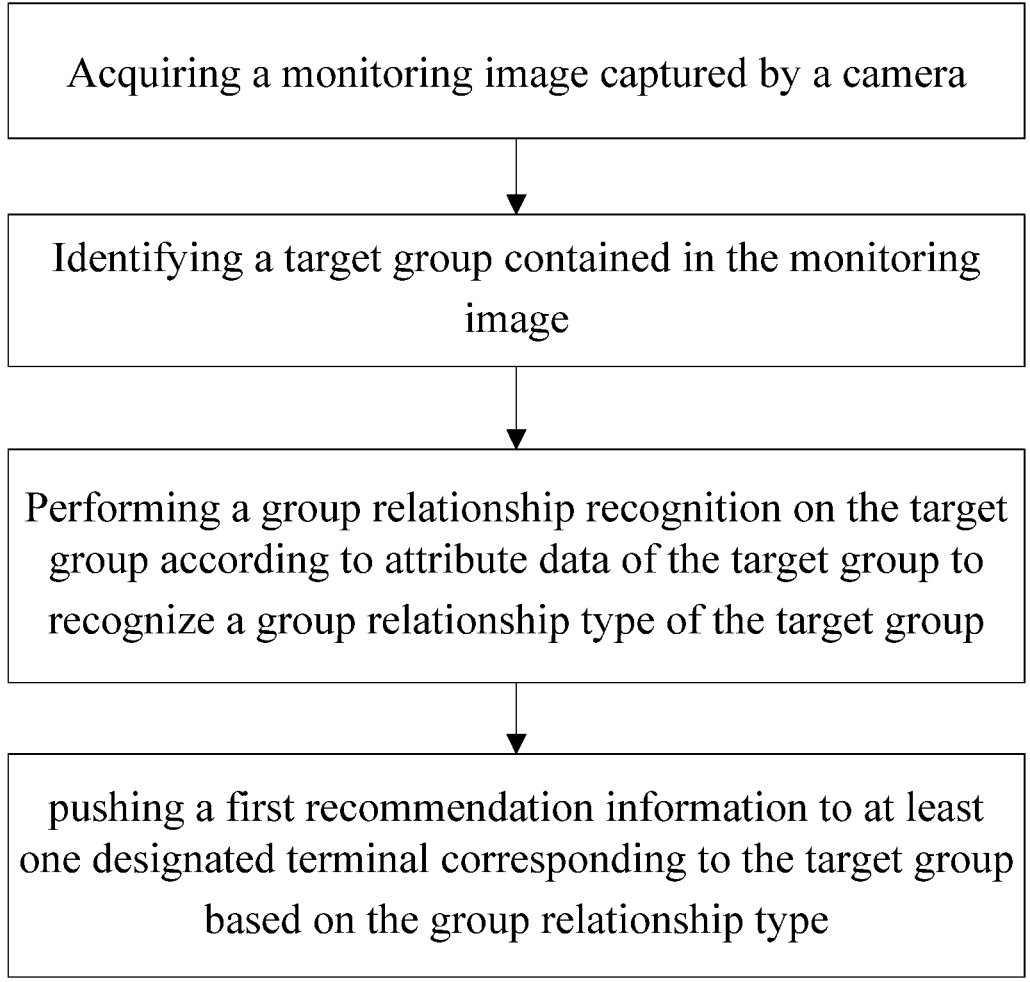
FIG. 2 illustrates a flow chart of an information push method according to some embodiments of the present disclosure.

FIG. 2 illustrates a flow chart of an information push method according to one embodiment of the present disclosure that can be performed by a terminal, such as by a server of a physical store. As illustrated in FIG. 2, the information push method comprises: acquiring a monitoring image captured by a camera; identifying a target group contained in the monitoring image; performing a group relationship recognition on the target group according to attribute data of the target group to recognize a group relationship type of the target group; and pushing a recommendation information to at least one designated terminal corresponding to the target group based on the group relationship type.

The camera can be installed at a preset location, such as a location where objects need to pass by, for example, an entrance and an exit of a physical store, a shopping mall elevator opening, and an indoor public area, and is configured to capture images in the camera monitoring area in real time. A plurality of cameras can be installed, and the number and location of the camera can be flexibly set according to the requirements of the physical store. Since the objects in the physical shopping mall are all dynamic, in order to analyze the objects more accurately and reliably, a plurality of monitoring images can be taken, such as all the monitoring images acquired by the camera in a preset time period.

Identifying a targeted group contained in the monitoring image. It can be understood that a plurality of consumers appearing in the monitoring area can be contained in one monitoring image acquired by the camera, and thus it is necessary to identify at least two persons having a relevant relationship among the plurality of consumers as the target objects. For example, five persons A, B, C, D, and E appears in the monitoring image, wherein A, B, and C are a family of three and are related to each other, and D and E are individual consumers, respectively, and it can be determined that the target objects contained in the monitoring image is, A, B, and C.

During identifying the target group, object data of a plurality of objects contained in the monitoring image are first identified, and then a target group can be identified according to the object data of the plurality of objects, for example, a plurality of objects having relevant relationship are identified as target objects according to the object data of the plurality of objects, and the target objects is determined as a target group. The object data can comprise more than one of identity data (such as user name, ID number, membership number, etc.), data of gender data, data of age, behavior data (such as motion trajectory, action gesture, etc.), associated item data (such as articles that users can touch, for example a cart, a backpack, a bag held by a user, and the like), and associated terminal data (such as a user's mobile phone number, a user's APP account). For example, the face recognition technology, the attribute recognition technology, the motion recognition technology, the behavior trajectory recognition technology, the object recognition technology, and the object relevant relationship recognition technology can be respectively used to determine the identity data, the data of gender, the data of age, the posture motion data, the trajectory data, and the associated item data of the plurality of objects. For the object data and the like, reference can be made to the technologies related to the above technical field, and details will not be elaborated herein.

For ease of understanding, how to determine a plurality of target objects with relevant relationship based on object data of a plurality of objects will be described hereinafter by taking two examples.

In one example, the object data comprises behavior data; when identifying a plurality of target objects having relevant relationship, behavioral similarity analysis can be performed on behavior data of the consumers to obtain behaviors similarity of the respective objects with respect to other objects; determining a plurality of objects whose behavior similarity is higher than a preset behavior similarity threshold as a plurality of target objects having relevant relationship.

In implementation, the behavior similarity analysis can analyze the similarity of the posture motion data and the trajectory data and the like of the objects. In the analysis, a criterion for measuring the behavior similarity can be preset, for example, correspondences between the degree of difference in the posture of two persons and the behavior similarity are preset, or correspondences between the gestures and motions of the two persons and the behavior similarity are preset. It should be understood that the behavior similarity analysis mentioned in the present disclosure can comprise not only the degree of behavior similarity, but also the degree of behavior matching. For example, if it is determined that the objects A and B have a movement of hand in hand through the gesture recognition, and A and B are in continuous limb contact and have similar motion trajectory, then it can be considered that A and B have higher behavior similarity. If it is determined that object A bends his arm around the shoulder of object B and the two arms of object B sag naturally, then the motions of A and B have higher degree of matching as A and B are in continuous limb contact and have similar motion trajectory and A and B have higher behavior similarity, even though B does not have the same action as A.

In the behavior similarity analysis, multiple objects in the monitoring images can be compared in pairs, and the behavior similarity of each object with respect to other objects is obtained. Of course, in view of that most of target objects with relevant relationships are relatively close to each other, when performing behavior similarity analysis on the behavior information of multiple objects, it is also possible to compare only a plurality of objects within a preset distance range, and directly set the behavior similarity of multiple objects outside the preset distance range to 0 to improve efficiency of the behavior similarity analysis. For example, if the monitoring image contains three persons, A, B and C, wherein a distance between A and B is within 1 meter of the preset distance range, and the distance between A and C and between B and C are both greater than 1 meter, then when the behavior similarity analysis is performed on A, B, and C, only the behavior similarity between A and B is compared, and the behavior similarity between A and C and the behavior similarity between B and C are directly set to zero.

Based on the manner mentioned above, a plurality of objects having substantially the same motion trajectory can be set as a target group, and/or a plurality of objects having action postures similar to each other or matching with each other can be set as a target group.

In another example, the object data comprises associated item data, and when identifying a plurality of objects having relevant relationship, a plurality of objects having the same associated item data can be identified according to the determined associated item data of the plurality of objects, and the plurality of objects which are identified as having the same associated item data can be set as a plurality of target objects having a relevant relationship. For example, in the monitoring image, it is recognized that an object A pushes a stroller, an object B sits in the stroller, an object C is in contact with the stroller and takes a nursing bottle from the stroller. And then, it is considered that the objects A, B and C are all related to the stroller, and A, B and C have the same associated item data (associated with the stroller), it can be determined that the objects A, B, and C have a relevant relationship, and the objects A, B, and C can be identified as the target objects, and can be identified as a target group.

According to a plurality of attribute data, a group relationship recognition is performed on the target group to recognize a group relationship type of the target group. For example, the group relationship type of the target group can be recognized according to one or more of attribute data, such as data of genders, data of ages, data of posture action, data of behavior trajectory of the target objects.

In implementation, the group relationship recognition can be performed on the target group by referring to the following steps.

(1) Determining attribute data of the target group based on the object data of the target objects, the attribute data comprising one or more of data of amount of the target group, data of ages of the target group, data of gender of the target group, data of trajectory and data of action of the target group. The data of amount of the target group stand for the total number of the target objects; the data of age of the target group strand for ages of each target object and/or age difference between the target objects; the data of gender of the target group stands for gender of each target object and/or gender ratio of the target objects; the data of trajectory of the target group stands for trails of the target objects, and of course, also stands for shopping tracks of the target objects; and the data of action of the target group stands for actions of each target object and/or relevant actions of multiple target objects, wherein the actions of the plurality of target objects can comprise active motions of the target objects, such as posture motions or shopping motions. It should be noted that the above is merely illustrative of the attribute data of a target group and should not be considered as a limit to the present disclosure.

(2) Searching a group relationship type matching the attribute data of the target group in the pre-established group relationship library; wherein, correspondence between the group relationship type and the attribute data is established in the group relationship library.

(3) The group relationship type that is found matching the attribute data of the target group is set as the group relationship type of the target group.

It should be noted that, different group relationship types mostly have different attribute data. For example, if the group relationship type is husband-wife type, the corresponding attribute data are the following: two persons, one male and one female with age difference within a preset range (such as 5 years), with typical intimate contact actions such as holding hands and bending arm around the waist, having higher similarity in motion trajectory. If the group relationship type is a family type, the corresponding attribute data are the following: three or four persons, typically two adults with one child or two children, limb contacts between the adults and/or between the adults and the children, having higher similarity in motion trajectory. If the group relationship type is a brother type, the corresponding attribute data are the following: two male, with age difference within a preset range (such as 15 years), without intimate contact actions, having higher similarity in motion trajectory. The above are merely illustrative, and in practical applications, for each group relationship type, a large number of groups can be sampled for common analysis, and the attribute data corresponding to the group relationship type are statistically obtained. Based on the statistically obtained correspondence between the group relationship type and the attribute data, a group relationship library is established, so that when recognizing a group relationship, a matched group relationship type can be found directly from the group relationship library according to the attribute data, thereby improving efficiency of recognizing group relationship among the target objects.

Step S208, pushing recommendation information to at least one designated terminal corresponding to the target group based on the recognized group relationship type. It should be noted that different group relationship types desire different information. For example, a group of mother-baby relationship needs more information on maternal and baby products information, while a group of lover relationship may be more concerned on dining and entertainment information, so based on the attribute data of the group relationship type, recommendation information is pushed purposely to the at least one designated terminal corresponding to the target group. The recommendation information can comprise merchant information such as product information and promotion information interested by the target group, and can further comprise precaution information corresponding to the group relationship type, for example, recommendation information corresponding to the mother-baby relationship can further comprise specific locations of mother and baby lounge in the physical store and etc., to fully enhance the user's shopping experience in the physical store.

In the information push method according to the embodiment of the present disclosure, after acquiring the monitoring image, a target group contained in the monitoring image can be identified and a group relationship type of the target group can be recognized. And further, recommendation information can be pushed to at least one designated terminal corresponding to the target group based on the group relationship type. Compared with the traditional way of promoting information by the physical store, the method according to the embodiment, on one hand, facilitates the targeted promotion to the group relationship type of consumers and improvement of information publicity effect, and on the other hand, helps the consumers to learn desired information quickly and directly and enhance the consumer experience.

In order to be able to push information to the target group in a purposeful manner, in the step S208 mentioned above, pushing recommendation information to the at least one designated terminal corresponding to the target group can be the following: first, searching for recommendation information corresponding to the group relationship type in a recommendation information library, in which correspondence between the group relationship type and the recommendation information is stored; determining the at least one designated terminal according to the target group according to the object data of the target objects contained in the target group; and then pushing the recommendation information to the at least one designated terminal corresponding to the target group.

In implementation, when the object data of the target objects in the target group comprises data of an associated terminal, the associated terminal is determined as the at least one designated terminal corresponding to the target group. The at least one designated terminal corresponding to the target group can a mobile smart terminal such as a mobile phone or a portable wearable device carried by the target objects contained in the target group. It should be noted that if a face data of one or more of the target objects in the target group as well as identity data and associated terminal data (such as mobile phone number, APP account, etc.) bound thereto are pre-stored in a server of the physical store, when the monitoring image is acquired, the one or more target objects in the monitoring image can be recognized by face recognition, and the identity data and the associated terminal data of the one or more target object can be determined. In implementation, pushing recommendation information to the at least one designated terminal of the target group can be carried out by sending short messages to at least one mobile phone of the target objects in the target group, or pushing information to the network platform such as WeChat, public number, APP, etc. of at least one of the target objects in the target group. In this way, it can be mainly used when the contact information of at least one of the target objects in the target group is known.

Considering that data of associated terminal of the target objects in the target group may not be stored in advance, such as when the target objects go to the physical store for shopping for the first time, the physical store has no record about the target objects. In this case, recommendation information can be pushed according to location data of the target objects. In implementation, when the object data of the target objects comprises location data, the following manner can be adopted: (1) determining a preset display device within the first distance range from the target group according to the location data, and determining the preset display device as a designated terminal corresponding to the target group, that is, the designated terminal can be a public display terminal near the location of the target group, and can be a preset wall-mounted display device or stand-up display device in a mall; (2) identifying a target merchant within a preset second distance range from the target group according to the location data, and determining a terminal associated with the target merchant as a designated terminal corresponding to the target group. That is, the designated terminal can be a merchant terminal near the location of the target group. Such a manner is mainly used when the contact information of the target objects in the target group is unknown.

When the designated terminal is a mobile smart terminal carried by at least one of the target objects in the target group or a public display terminal in the vicinity of the target group, the recommendation information can be information of the merchant interested by the target group, or information that the target group needs to pay attention to during the shopping. And the target group can directly learn the recommendation information through the designated terminal. When the designated terminal is a merchant terminal in the vicinity of the target group, the recommendation information can also be the product information that is interested by the target group, so that the merchant can directly introduce relevant information to the target group by means of manual marketing or the like.

In view of various group relationship types, it is difficult to determine a group relationship type directly from attribute data for a plurality of target objects with complex relationship, or, a corresponding group relationship type is not recorded in the relationship database, the method can further comprise the following:

(1) If a group relationship type matching the attribute data of the target group is not found, tracking shopping trajectory of the target group. For example, the shopping trajectory of the target group can be tracked through cameras distributed on various preset locations. And the shopping trajectory of the target group can also be tracked through cameras located in relevant merchants and CRM system.

(2) Establishing a group relationship type corresponding to the target group according to the attribute data and the shopping trajectory of the target group. For example, information such as shopping preference information of the target group can be obtained according to shopping route of the target group, type of the merchant selected, and the like. And then, a comprehensive analysis is carried on the attribute data and the shopping preference data so as to create a group relationship type corresponding to the target group.

(3) Storing correspondence between the created group relationship type and the attribute data of the target group in the relationship database. In this way, record information of the relationship database can be gradually improved.

In addition, in order to improve accuracy of the recommendation information based on the group relationship type, the method further comprises: tracking shopping trajectory of the target group; and according to the shopping trajectory of the target group, adjusting the recommendation information corresponding to the group relationship type of the target group stored in the recommendation information library. For example, supposing it is recorded that a target group having a certain relationship is interested in product X in the recommendation information library, and information on the product X is pushed to the target group with the certain relationship, however, it is found that the target group with the certain relationship take Y product instead of the product X when tracking the shopping trajectory of the target group. Thus, the corresponding recommendation information can be adjusted based on shopping trajectory of the target group. For example, the attribute data and shopping trajectories of various groups can be analyzed in the recommendation information library based on big data technology, and continuously evolve and the recommendation information library can be evolved and adjusted continuously based on the shopping trajectories of various groups, so as to push recommendation information matching persons having various relationship as much as possible, thereby improving the accuracy of recommendation information.

At least one embodiment of the present disclosure provides a method of building a recommendation information library, comprising:

(1) based on a stored group relationship types, acquiring data of shopping trajectory of a plurality of groups having the group relationship, the data of shopping trajectory comprises data of online shopping trajectory and/or data of physical store shopping trajectory. For ease of understanding, the present embodiment provides the following manners for obtaining data of online shopping trajectories and data of physical store shopping trajectories:

For the online shopping trajectory, a server of the physical store can be connected with a third-party server, and the third-party server can be a server of an online shopping platform. It can be understood that many existing online shopping platforms have functions of intimate payment, friend payment, family member group payment, so that the network shopping trajectory of the monitored target group can be obtained through the server of the online shopping platform. The online shopping trajectory can comprise shopping information of the consumer on the online shopping platform. In implementation, if the server of the physical store records the identity information of the consumer comprised in the monitored target group, or is associated with the online shopping APP of the consumer, online shopping trajectory based on group relationship consumption, such as through intimate payment, friend payment or family member group payment, can be queried from the server of the online shopping platform of the consumer.

For the physical store shopping trajectory, the shopping route and shopping behavior of the monitored group can be tracked through cameras arranged in each preset location in the physical store and the CRM system of the physical store.

(2) According to the historical shopping trajectory of a plurality of monitored group, attribute data of the shopping behavior common to the plurality of monitored groups are determined based on the big data analysis technology.

(3) Determining whether the determined amount of attribute data of common shopping behavior is greater than a preset amount.

(4) If yes, creating recommendation information corresponding to the group relationship type based on the attribute data of the common shopping behavior; if not, creating recommendation information based on the attribute data of the group relationship type. If quantity of attribute data of shopping behavior is greater, it indicates that the plurality of target objects with such a group relationship type has a more typical common consumption behavior, and the common consumption behavior has higher credibility, so that relevant information can be recommended to the plurality of target objects based on the common consumption behavior. For example, 70% of the plurality of target objects of the mother-child relationship type will enter a toy store for children, and the recommendation information comprises promotion information of the toy store for children. If the quantity of attribute data of the shopping behavior is less, the data credibility is low, and it is difficult to determine the typical common consumption behavior corresponding to the group relationship type, the default recommendation information can be generated based on the attribute data.

(5) The recommendation information library is built according to correspondence between the group relationship type and the recommendation information corresponding to the group relationship type.

In the above manner, a recommendation information library with credibility can be built, so that the recommendation information can be pushed to the at least one designated terminal corresponding to the target group more reasonably and reliably based on the attribute data of the target group.

In summary, the information push method according to the embodiments of the present disclosure facilitates the targeted promotion of the product by the merchant for the group relationship type of the objects on one hand, thereby improving the information publicity effect; and helps the objects quickly and directly to learn information they need on the other hand, thereby enhancing the shopping experience.

Figure 3:
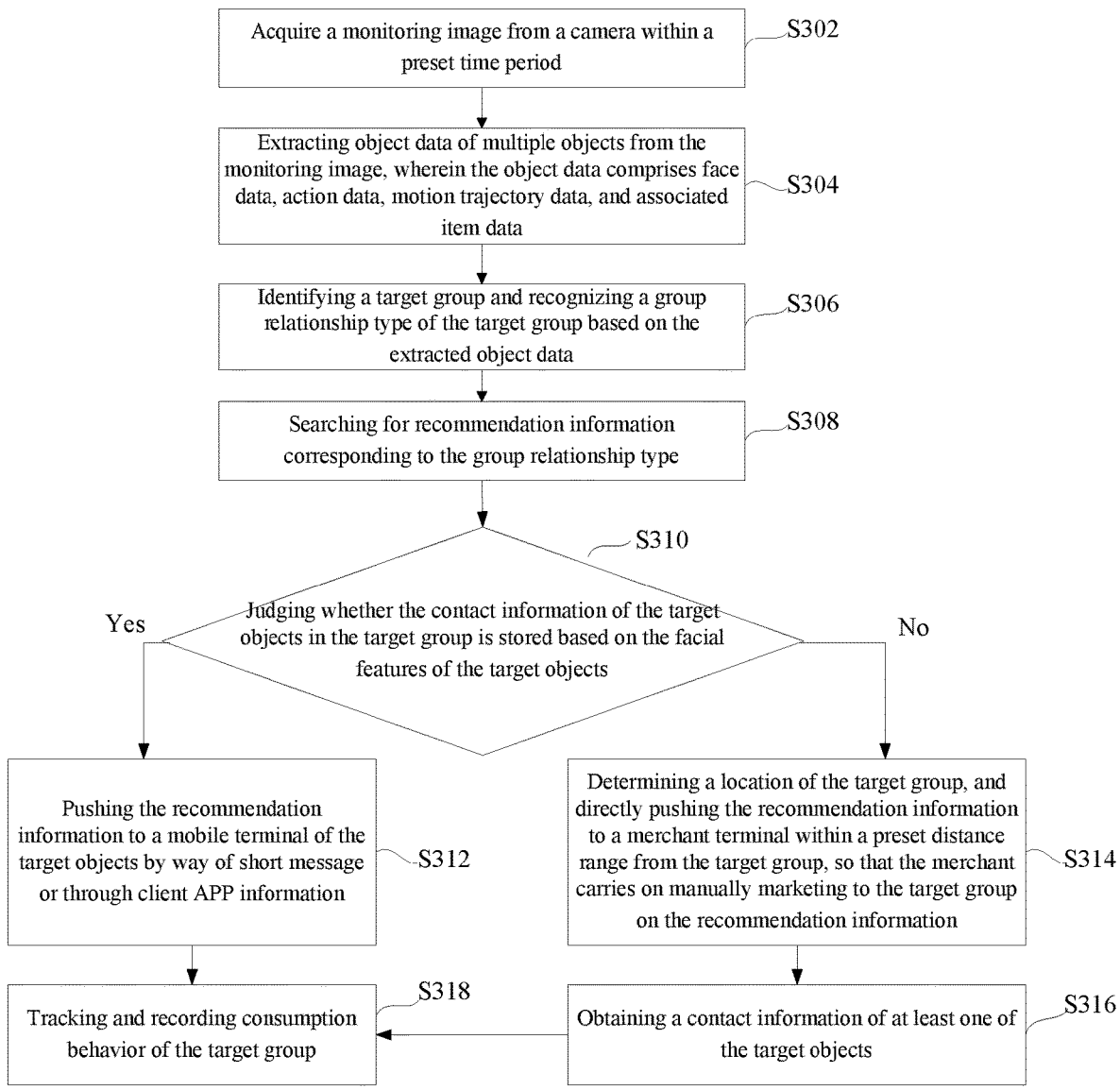
FIG. 3 illustrates a flow chart of an information push method according to some other embodiments of the present disclosure.

FIG. 3 illustrates a work flow chart of an information push method according to some other embodiments of the present disclosure, the information push method comprises:

Step S302: Acquire a monitoring image from a camera within a preset time period. For example, the preset time period can be 2 s or other set duration.

Step S304, extracting object data of multiple objects from the monitoring image, wherein the object data comprises face data, action data, motion trajectory data, and associated item data.

Step S306, identifying a target group and recognizing a group relationship type of the target group based on the extracted object data, wherein the target group comprises a plurality of target objects with a relevant relationship.

For example, objects with relevant relationship in the monitored image can be identified by the data of motion trajectory and/or the associated item data of the objects, and the objects with relevant relationship can be identified as a plurality of target objects; action posture and relationship between the plurality of target objects and the item can also be determined by the data of action and the associated item data of the plurality of target objects; object data such as data of gender, data of age and the like of the plurality of target objects can be determined through the facial feature of the plurality of target objects, and thus, attribute data of a target group containing the plurality of target objects can be determined, and further, a group relationship type of the target group can be recognized according to the attribute data. For the sake of understanding, a simple example is as follows: if an adult pushes a stroller and there is a baby item such as a nursing bottle next to an old man, and the adult and the old man enter the store at the same time or before and after, and the motion trajectory is almost the same, then the three people can be inferred to be three generations of grandparents in a family member relationship. If two persons enter the store, if the action feature of the two persons is determined to be intimate from the monitoring image, the motion trajectory is almost the same. If information of the facial features of the two people shows: a man and a woman with similar ages, it can be inferred that the two are of lover relationship or husband-wife relationship; if the information of the facial features of the two persons shows: same gender and similar in age, it can be inferred that the two are girlfriends or friends; if the information of the facial features of the two shows: a man and a woman with great difference in age, it can be inferred that the two are the father and the daughter, the mother and the son or the grandparent and the grandchildren in a family; if the information of the facial features of the two shows: same-sex and great difference in age, it can be inferred that the two are the father and the son, the mother and the daughter or the grandparent and the grandchildren in a family.

Step S308, searching for recommendation information corresponding to the group relationship type.

Step S310, judging whether the contact information of the target objects in the target group is stored based on the facial features of the target objects. If yes, go to step S312, if no, go to step S314.

Step S312, pushing the recommendation information to a mobile terminal of the target objects by way of short message or through client APP information. In this way, the target objects in the target group can easily obtain recommendation information through their own mobile phones, smart watches, and the like. Then step S318 can be directly executed.

Step S314, determining a location of the target group, and directly pushing the recommendation information to a merchant terminal within a preset distance range from the target group, so that the merchant carries on manually marketing to the target group on the recommendation information.

Step S316, obtaining a contact information of at least one of the target objects. For example, when the target object checks out in the physical store, at least one contact information of the target objects can be obtained by means of membership registration, information registration, and third-party platform payment. And then Step S318 can be performed.

Step S318, tracking and recording consumption behavior of the target group. The consumption behavior is also equivalent to the shopping trajectory mentioned in the foregoing.

It should be noted that FIG. 3 only schematically illustrates an information push method. In practical applications, the execution order of some steps can be interchanged or performed simultaneously, and some steps may not be performed. For example, step S310 can be performed simultaneously with step S306, that is, when analyzing the facial features of the target objects, not only the gender, age, etc. of the target objects that can be used to recognize the relationship can be determined, but also the identity of the target objects can be simultaneously identified, and it is searched whether the contact information corresponding to the identity of at least one of the target objects is recorded or not.

Through the above manner, when objects enter a physical store, a plurality of target objects in a target group can be identified and a group relationship type recognition is performed on the target objects based on attribute data of the target objects so as to recognize a group relationship type of the target group, and thus, information can be purposely recommended based on the group relationship type of the target group, and the target group can conveniently obtain the required information, thereby improving the shopping experience of the target objects. It also helps the merchants to carry on promotion and enhance the promotion effect.

Figure 4:
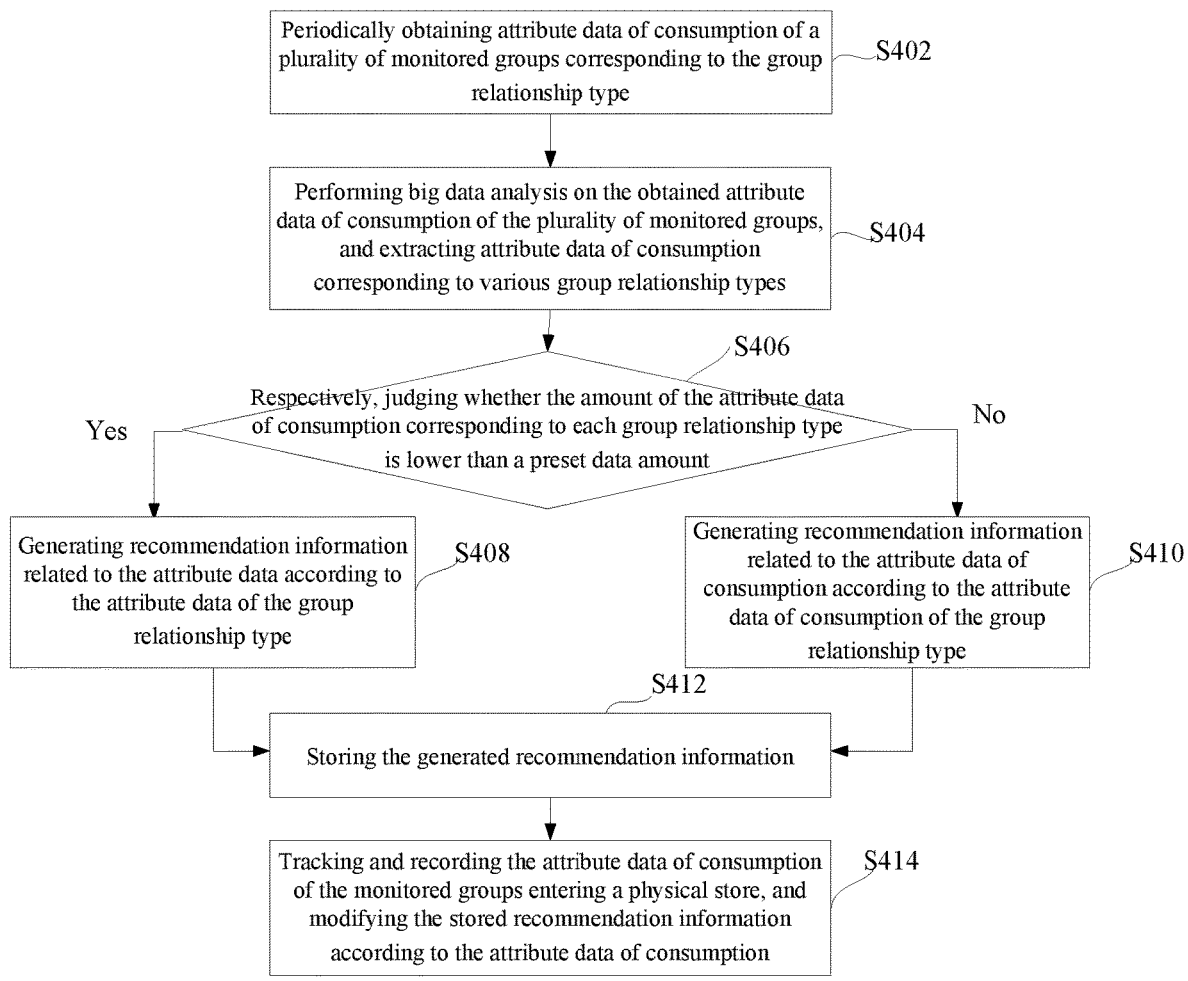
FIG. 4 illustrates a working flow chart of a recommendation information system in accordance with some other embodiments of the present disclosure.

In implementation, in the foregoing step S308, recommendation information corresponding to the group relationship type can be searched in the recommendation information library. For ease of understanding, workflow of the recommendation information library will be described hereinafter. Referring to a workflow chart of an recommendation information library as illustrated in FIG. 4, the workflow of the recommendation information library comprises:

Step S402, periodically obtaining attribute data of consumption of a plurality of monitored groups corresponding to the group relationship type. The attribute data of consumption comprises attribute data of online consumption and attribute data of offline consumption, the attribute data of online consumption is equivalent to the online shopping trajectory in the foregoing embodiment, and the attribute data of offline consumption is equivalent to the physical store shopping trajectory in the foregoing embodiment.

Step S404, performing big data analysis on the obtained attribute data of consumption of the plurality of monitored groups, and extracting attribute data of consumption corresponding to various group relationship types.

Step S406, respectively, judging whether the amount of the attribute data of consumption corresponding to each group relationship type is lower than a preset data amount. If yes, go to step S408, if no, go to step S410.

Step S408, generating recommendation information related to the attribute data according to the attribute data of the group relationship type.

Step S410, generating recommendation information related to the attribute data of consumption according to the attribute data of consumption of the group relationship type.

Step S412, storing the generated recommendation information.

Step S414, tracking and recording the attribute data of consumption of the monitored groups entering a physical store, and modifying the stored recommendation information according to the attribute data of consumption.

In the above manner, it is possible to build a recommendation information library with credibility, so as to push appropriate recommendation information to the target group based on the group relationship type of the target group.

In summary, the information push method provided by the embodiment facilitates the merchant to enhance the information publicity effect; and also facilitates the target group to quickly and directly learn the required information, thereby effectively improving the shopping experience in physical stores.

Figure 5:
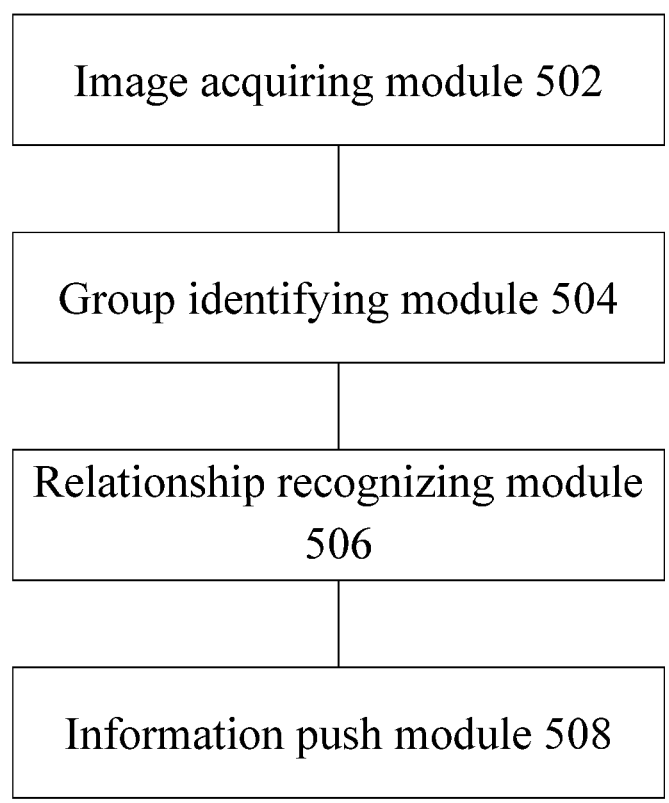
FIG. 5 illustrates a schematic structural diagram of an information push device according to some other embodiments of the present disclosure.

At least one embodiment of the present disclosure provides an information push device. Referring to a structure of the information push device as illustrated in FIG. 5, the information push device comprise:

An image acquiring module 502, configured to acquire a monitored image captured by a camera;

A group identifying module 504, configured to identify a target group contained in the monitored image;

A relationship recognizing module 506, configured to perform group relationship type recognition on the target group so as to identifying a group relationship type of the target group; and An information push module 508, configured to push recommendation information to at least one designated terminal corresponding to the target group according to the group relationship type.

In the above information push device according to the embodiment of the present disclosure, after acquiring the monitoring image, a target group contained in the monitoring image can be identified, and the group relationship type of the target group is recognized, and then the recommendation information is pushed to the at least one designated terminal corresponding to the target group according to the group relationship type. With respect to the traditional way of promoting the information of the physical store, the method according to the embodiment facilitates the purposeful promotion based on the group relationship type of the target group on one hand, thereby improving the information publicity effect; and on the other hand, helps the target group quickly and directly access the required information, thereby enhancing the shopping experience.

In some embodiments of the present disclosure, the group identifying module 504 comprises: an object data determining unit configured to determine object data of a plurality of objects contained in the monitored image; a target group identifying unit, configured to identify a target group according to the object data of the plurality of objects.

In some embodiments of the present disclosure, the object data comprises behavior data; the target group identifying unit is further configured to: perform behavior similarity analysis on behavior data of the plurality of objects, and obtain behavior similarity of each object with respect to other objects and determine a plurality of objects with behavior similarity higher than a preset behavior similarity threshold as a plurality of target objects with relevant relationship.

In some embodiments of the present disclosure, the object data comprises associated item data, and the target objects identifying module is further configured to: identify, according to the associated item data, a plurality of objects having a same item associated data; and determine the plurality of objects having the same associated item data as a plurality of target objects with relevant relationship.

In some embodiments, the relationship recognizing module 506 is configured to: determine attribute data of the target group according to the object data of the target objects in the target group; the attribute data comprising one or more of data of amount of the target objects, data of age, data of gender, data of trajectory, and data of behavior; search a group relationship type matching the attribute data of the target group in a pre-established group relationship type library; wherein correspondence between the group relationship type and the attribute data is established in the group relationship type library; and determine the group relationship type matching the attribute data of the target group as a group relationship type of the target group.

The information push device according to the embodiment further comprises:

A trajectory tracking module, configured to track shopping trajectory of the target group if no group relationship type matching the attribute data of the target group is found;

A group relationship type creating module, configured to create a group relationship type corresponding to the target group according to the attribute data and the shopping trajectory of the target group; and A storage module, configured to store correspondence between the created group relationship type and the attribute data of the target group in the group relationship type library.

In some embodiments of the present disclosure, the information push module 508 comprises an information searching unit, a terminal determining unit, and an information pushing unit which are sequentially connected.

The information searching unit is configured to search for recommendation information corresponding to the group relationship type in the preset recommendation information library; wherein the recommendation information library stores a correspondence between the group relationship type and the recommendation information.

The terminal determining unit is configured to determine at least one designated terminal corresponding to the target group according to the object data of the target objects in the target group. The terminal determining unit is further configured to: if the object data of at least one of the target objects comprises data of associated terminal, determine the associated terminal of at least one of the target objects as the at least one designated terminal corresponding to the target group; if the object data of the target objects comprises a location data, identifying, according to the location data, a preset display device within a preset first distance range from the target group, determining the preset display device as the at least one designated terminal corresponding to the target group; and/or identifying, according to the location data, a target merchant within a preset second distance range from the target group, and an associated terminal of the target merchant is determined as the at least one designated terminal corresponding to the target group.

The information pushing unit is configured to push the recommendation information to the at least one designated terminal corresponding to the target group.

Further, the information pushing device according to this embodiment further comprises: a trajectory tracking module configured to track a shopping trajectory of the target group; and an information adjusting module configured to adjust recommendation information which corresponds to the group relationship type of the target group and is stored in the recommendation information library based on the shopping trajectory of the target group.

Further, the embodiment provides a method for building a recommendation information library. For example, the information pushing device is further configured to: acquire, according to the stored group relationship type, a historical shopping trajectory of a plurality of monitored groups having such a relationship, the shopping trajectory comprising an online shopping trajectory and/or a physical shopping trajectory; determining attribute data of common shopping behavior shared by the plurality of monitored groups according to the historical shopping trajectory of the plurality of monitored groups; judging whether the determined amount of the attribute data of common shopping behavior is higher than a preset amount; if yes, generating recommendation information corresponding to the group relationship type based on the attribute data of common shopping behavior; if not, generating recommendation information corresponding to the group relationship type based on the attribute data of the group relationship type; and building recommendation information library based correspondence between the group relationship type and the recommendation information.

The implementation principle and the technical effects of the information pushing device are the same as those in the foregoing embodiment. For the sake of brief description, if any part is not mentioned in the device embodiment, reference can be made to the corresponding content in the foregoing method embodiment.

At least one embodiment of the present disclosure provides an information push system, comprising: an image acquiring device, a processor, and a storage device; wherein, the image capture device is configured to capture image information; the storage device stores a computer program, and the computer program is executed by the processor to perform the method as provided by the foregoing method embodiments.

One of ordinary skill in the art can clearly understand that, for the convenience and brevity of the description, the specific working process of the system described above can refer to the corresponding process in the foregoing method embodiments, and details will not be elaborated herein.

Further, at least one embodiment of the present disclosure further provides a computer readable storage medium, on which a computer program, and the computer program performs the steps of the method according to the foregoing method embodiment if executed by the processor.

The computer program product of the information push method, the information push device and the information push system according the embodiments of the present disclosure comprises a computer readable storage medium on which program code is stored, and the program code comprises instructions configured to execute the method described in the foregoing method embodiment. Implementation can be referred to the method embodiment, and details will be not elaborated herein.

The functions can be stored in a computer readable storage medium if implemented in the form of a software functional unit and sold or used as a standalone product.

Based on such understanding, the technical solution of the present disclosure, which is essential or contributes to the prior art, or a part of the technical solution, can be embodied in the form of a software product, which is stored in a storage medium, comprising instructions configured to cause a computer device (which may be a personal computer, server, or network device, etc.) to perform all or part of the steps of the methods described in various embodiments of the present disclosure. The foregoing storage medium comprises: a flash disk, a mobile hard disk, a read-only memory (ROM), a random access memory (RAM), a magnetic disk, or an optical disk, and the like, which can store program code.

The foregoing are merely exemplary embodiments of the disclosure, but are not used to limit the protection scope of the disclosure. The protection scope of the disclosure shall be defined by the attached claims.

What is claimed is:

1. An information push method comprising:
   acquiring a monitoring image captured by a camera;
   determining object data of a plurality of objects contained in the monitoring image, identifying a plurality of target objects having relevant relationship according to object data of the plurality of objects as a target group in the monitoring image;
   performing a group relationship recognition on the target group according to at least one attribute data of the target group to recognize a group relationship type of the target group; and
   pushing a recommendation information to at least one designated terminal corresponding to the target group based on the group relationship type,
   wherein the object data comprises behavior data, and identifying the plurality of target objects having relevant relationship according to the object data of the plurality of objects comprises:
   performing behavior similarity analysis on the behavior data of the objects so as to obtain behavior similarity of each object with respect to other objects; and
   determining a plurality of objects with behavior similarity higher than a preset similarity threshold as the plurality of target objects with relevant relationship.

2. The information push method according to claim 1, wherein the object data further comprises associated item data, and
   wherein identifying the plurality of target objects having the relevant relationship according to the object data of the plurality of objects further comprises:
   determining a plurality of objects with same associated item data according to associated item data; and
   identifying the plurality of objects with the same associated item data as the plurality of target objects with the relevant relationship.

3. The information push method according to claim 1, wherein performing the group relationship recognition on the target group according to the at least one attribute data of the target group to recognize a group relationship type of the target group comprises:
   determining attribute data of the target group according to the object data of the plurality of target objects, wherein the attribute data comprise: one or more of data of amount, data of age, data of gender, data of trajectory, and data of behavior;
   searching for a first relationship type that matches the attribute data of the plurality of target objects in a pre-established group relationship type library, wherein correspondence between the group relationship type and the attribute data is established in the group relationship type library; and
   setting the first relationship type as the group relationship type of the target group.

4. The information push method according to claim 3, further comprising:
   tracking shopping trajectory of the target group if no group relationship type that matches the attribute data of the target group is found;
   creating a second group relationship type corresponding to the target group according to the attribute data of the target group and shopping trajectory of the target group; and
   storing correspondence between the second group relationship type and the attribute data of the target group in the group relationship type library.

5. The information push method according to claim 3, wherein pushing the recommendation information to the at least one designated terminal corresponding to the target group based on the group relationship type comprises:
   searching the recommendation information corresponding to the group relationship type in a recommendation information library, wherein correspondence between the recommendation information and the group relationship type is stored;
   determining the at least one designated terminal corresponding to the target objects according to the object data of the plurality of target objects; and
   pushing the recommendation information to the designated terminal corresponding to the plurality of target objects.

6. The information push method according to claim 5, wherein determining the at least one designated terminal corresponding to the target objects according to the object data of the plurality of target objects comprises:
   determining at least one associated terminal of the plurality of target objects as the at least one designated terminal corresponding to the plurality of target objects, when the object data of the plurality of target objects comprises data of at least one associated terminal.

7. The information push method according to claim 5, wherein determining the at least one designated terminal corresponding to the target objects according to the object data of the plurality of target objects comprises:
   when the object data of the plurality of target objects comprises location data:
   identifying a preset display device within a first distance range from the plurality of target objects according to the location data, and determining the preset display device as the at least one designated terminal corresponding to the target objects; or identifying a target merchant within a second distance range from the target group according to the location data, and determining a terminal associated with the target merchant as the at least one designated terminal corresponding to the target group.

8. The information push method according to claim 5, further comprising:

tracking shopping trajectory of the target group; and adjusting the recommendation information which matches the group relationship type of the target group and is stored in the recommendation information library according to the shopping trajectory of the target group, and storing the adjusted recommendation information in the recommendation information library.

9. The information push method according to claim 5, further comprising:

based on a stored group relationship type, acquiring data of shopping trajectory of a plurality of groups corresponding to the stored group relationship type, the data of shopping trajectory comprising at least one of data of online shopping trajectory or data of physical store shopping trajectory;

determining attribute data of shopping behavior shared by the groups according to the data of shopping trajectory of the groups;

determining whether an amount of the attribute data of shopping behavior is greater than a preset amount;

if the amount of the attribute data of shopping behavior is greater than the preset amount, creating a recommendation information corresponding to the group relationship type based on the attribute data of shopping behavior;

if the amount of the attribute data of shopping behavior is not greater than the preset amount, creating a recommendation information corresponding to the group relationship type based on the attribute data of the group relationship type; and building a recommendation information library according to correspondence between the group relationship type and the recommendation information corresponding to the group relationship type.

10. An information push system, comprising:

an image acquiring device configured to capture image data;

a processor; and a storage device configured to store a computer program;

wherein the computer program is configured to perform an information push method when executed by the processor, the information push method comprising:

acquiring a monitoring image captured by a camera, determining object data of a plurality of objects contained in the monitoring image, identifying a plurality of target objects having relevant relationship according to object data of the plurality of objects as a target group in the monitoring image;

performing a group relationship recognition on the target group according to at least one attribute data of the target group to recognize a group relationship type of the target group, and pushing a recommendation information to at least one designated terminal corresponding to the target group based on the group relationship type, wherein the object data comprises behavior data, and identifying the plurality of target objects having relevant relationship according to the object data of the plurality of objects comprises:

performing behavior similarity analysis on the behavior data of the objects so as to obtain behavior similarity of each object with respect to other objects; and determining a plurality of objects with behavior similarity higher than a preset similarity threshold as the plurality of target objects with relevant relationship.

11. The information push system according to claim 10, wherein the object data further comprises associated item data, and wherein identifying the plurality of target objects having the relevant relationship according to the object data of the plurality of objects further comprises:

determining a plurality of objects with same associated item data according to associated item data, and identifying the plurality of objects with the same associated item data as the plurality of target objects with the relevant relationship.

12. The information push system according to claim 10, wherein performing the group relationship recognition on the target group according to the at least one attribute data of the target group to recognize a group relationship type of the target group comprises:

determining attribute data of the target group according to the object data of the plurality of target objects, wherein the attribute data comprise: one or more of data of amount, data of age, data of gender, data of trajectory, or data of behavior, searching for a first relationship type that matches the attribute data of the plurality of target objects in a pre-established group relationship type library, wherein correspondence between the group relationship type and the attribute data is established in the group relationship type library, and setting the first relationship type as the group relationship type of the target group.

13. The information push system according to claim 12, wherein the information push method further comprises:

tracking shopping trajectory of the target group if no group relationship type that matches the attribute data of the target group is found, creating a second group relationship type corresponding to the target group according to the attribute data of the target group and shopping trajectory of the target group, and storing correspondence between the second group relationship type and the attribute data of the target group in the group relationship type library.

14. A non-transitory computer readable storage medium on which a computer program is stored, wherein the computer program performs an information push method when executed by a process device, wherein the information push method comprises:

acquiring a monitoring image captured by a camera;

determining object data of a plurality of objects contained in the monitoring image, identifying a plurality of target objects having relevant relationship according to object data of the plurality of objects as a target group in the monitoring image;

performing a group relationship recognition on the target group according to at least one attribute data of the target group to recognize a group relationship type of the target group; and pushing a recommendation information to at least one designated terminal corresponding to the target group based on the group relationship type, wherein the object data comprises behavior data, and identifying the plurality of target objects having relevant relationship according to the object data of the plurality of objects comprises:

performing behavior similarity analysis on the behavior data of the objects so as to obtain behavior similarity of each object with respect to other objects; and determining a plurality of objects with behavior similarity higher than a preset similarity threshold as the plurality of target objects with relevant relationship.

* * * * *